United States Patent [19]
Kawasumi et al.

[11] Patent Number: 5,842,354
[45] Date of Patent: Dec. 1, 1998

[54] CLIMATE CONTROLLER FOR AUTOMOBILES

[75] Inventors: Kazuhito Kawasumi; Shinichi Sato; Hideo Mori; Toshihiko Nasu; Motonobu Kawakami, all of Kariya; Akio Morishita, Okazaki, all of Japan

[73] Assignee: Kabushiki Kaisha Toyoda Jidoshokki Seisakusho, Kariya, Japan

[21] Appl. No.: 831,909

[22] Filed: Apr. 2, 1997

[30] Foreign Application Priority Data

Apr. 3, 1996 [JP] Japan ................................ 8-081656

[51] Int. Cl.⁶ .................................................. F25B 41/04
[52] U.S. Cl. .............................. 62/206; 62/158; 62/217; 62/193
[58] Field of Search .............................. 62/205, 206, 158, 62/192, 193, 208, 217

[56] References Cited

U.S. PATENT DOCUMENTS

| | | | |
|---|---|---|---|
| 2,074,526 | 3/1937 | Williams | 62/217 X |
| 2,581,956 | 1/1952 | Jones | 62/217 X |
| 3,722,228 | 3/1973 | Smith | 62/206 |
| 4,227,380 | 10/1980 | Laucks et al. | 62/217 |

Primary Examiner—Harry B. Tanner
Attorney, Agent, or Firm—Burgess, Ryan & Wayne

[57] ABSTRACT

A climate controller for an automobile, comprising a compressor and a receiver arranged in an engine compartment of the automobile, a condenser located at an outside-air inlet of the engine compartment, an expansion member and an evaporator disposed in a passenger compartment of the automobile, and a closed-loop refrigerant passage connecting the compressor, the condenser, the receiver, the expansion member and the evaporator in sequence for circulating a refrigerant through these components to establish a refrigerating cycle. The climate controller further includes a valve arranged in a part of the closed-loop refrigerant passage extending from the evaporator through the compressor to the condenser. The valve is actuated to intersect a communication of the refrigerant through the part of the passage when an operation affecting temperature of both the compressor and the condenser becomes ineffective, and to allow the communication when the operation becomes effective.

14 Claims, 3 Drawing Sheets

CLIMATE CONTROLLER FOR AUTOMOBILES

BACKGROUND OF THE INVENTION

1. Field of the Invention

The present invention relates generally to a comfort control system, and more particularly to a climate controller used for the air-conditioning and heating of the passenger compartment of an automobile.

2. Description of the Related Art

FIG. 1 shows an arrangement of components of a conventional climate controller used for automobiles. As shown in the drawing, the conventional climate controller for automobiles includes a closed-loop passage or circuit for a refrigerant, which connects a compressor 1, a condenser 2, a receiver 3, an expansion valve 4 and an evaporator 5 in sequence, so as to enable the refrigerant to circulate through these components in this order and to establish a refrigerating cycle.

When such a climate controller operates, a refrigerating cycle is established to create a high temperature/high pressure section and a low temperature/low pressure section in the closed-loop refrigerant circuit, and when the climate controller does not operate, the refrigerant flows in the closed-loop circuit to entirely equalize the pressure therein.

That is, when this climate controller operates, a high temperature/high pressure section is created at a gas discharging area of the compressor 1, the condenser 2 and the receiver 3, and a low temperature/low pressure section is created at a low pressure gas area of the compressor 1 and the evaporator 5. A suction valve (not shown) of the compressor 1 and the expansion valve 4 constitute boundaries of these sections.

On the other hand, when this climate controller does not operate, or, e.g., just after the climate controller stops, the refrigerant flows from the high temperature/high pressure section to the low temperature/low pressure section to equalize the pressure in the refrigerant circuit. In this connection, a route through which the refrigerant flows from the high temperature/high pressure section to the low temperature/low pressure section may be obtained as a first route leading through the suction valve of the compressor 1 to the evaporator 5 and a second route leading through the expansion valve 4 to the evaporator 5. In practice, when the climate controller does not operate, the suction valve in the first route opens and the expansion valve 4 in the second route substantially closes, and therefore, the refrigerant flows during a pressure equalizing state mainly through the first route and hardly through the second route.

Further, if the ambient temperature surrounding each of the components of the climate controller changes during the time that the controller does not operate, the refrigerant evaporates or condenses in each component in response to the temperature changes to vary the pressure in each component, so as to maintain a saturated state of the refrigerant in each component. When the pressure is not equal between the components due to the above temperature changes, the refrigerant also flows between the components to entirely equalize the pressure in the refrigerant circuit.

In the conventional climate controller for automobiles, the compressor 1 and the receiver 3 are arranged within an engine compartment 6, the condenser 2 is located in the vicinity of a fresh-air inlet 7 of the engine compartment 6, and the evaporator 5 and the expansion valve 4 are disposed within a passenger compartment 8.

When the climate controller and the engine are left in a stopped condition, the temperature and the pressure of each component in the refrigerant circuit is affected due to the temperature changes in an outside atmosphere of the automobile and an inside atmosphere of the passenger compartment, and the temperature/pressure relationship between the components becomes a different state from that in an operating condition or a condition just after being brought to a stop. Consequently, the refrigerant flows to equalize the pressure in the refrigerant circuit in a different manner from the operating condition or the condition just after being brought to a stop.

That is, the temperature of the condenser 2 directly exposed to the outside atmosphere is first lowered, and the temperature of the compressor 1 and the receiver 3 arranged inside the engine compartment, into which fresh outside air is directed, is then lowered. On the other hand, the temperature of the evaporator 5 is not readily lowered because the evaporator 5 is disposed inside the passenger compartment 8, into which the outside air is not directed. Therefore, the evaporator 5 has the highest temperature and pressure, the condenser 2 has the lowest temperature and pressure, and the compressor 1 has a temperature and a pressure lying therebetween.

In particular, as often happens in a certain place where the temperature between day and night suddenly changes or the temperature of the outside atmosphere is significantly lowered at night, if the temperature of the outside atmosphere is lowered below the predetermined value, the refrigerant in the condenser 2 or the compressor 1 may begin to condense and liquefy.

When the refrigerant begins to liquefy in the condenser 2, the refrigerant in the evaporator 5 having a higher temperature transfers into the compressor 1 having a middle temperature, and further into the condenser 2, to equalize the pressure in the refrigerant circuit.

Particularly, when the climate controller and the engine of the automobile are left in a stopped condition for a long time, the condensation and liquefaction of the refrigerant in the condenser 2 and the compressor 1, as well as the transfer of the refrigerant from the evaporator 5 through the compressor 1 to the condenser 2, are repeated for long time.

Thus, the refrigerant liquefied in the compressor 1 is mixed with a lubricating oil stored therein and then is discharged into the condenser 2 due to the pressure difference. As the result of this, the lubricating oil is discharged together with the refrigerant being discharged, so that the lubricating oil in the compressor 1 is entirely transferred into the condenser 2 together with the transfer of the refrigerant, whereby the compressor 1 reaches a condition where no lubricating oil exists therein, i.e., a dry condition. This results in the problem of the failure of lubrication when the climate controller starts operation.

Recently, hydrofluorocarbon alternative fluorocarbon (so called "flon") materials, such as HFC-134a (1,1,1,2-tetrafluoroethane), which contains no chlorine, has been used as a refrigerant which can eliminate the problem of destruction of ozonosphere due to a fluorocarbon gas. This kind of refrigerant has a good compatibility with a lubricating oil, whereby the problem of the failure of lubrication remarkably arises in the climate controller using such alternative fluorocarbon materials. Therefore, the failure of lubrication due to the drying-up of the lubricating oil is a new problem in the field of climate controllers for automobiles.

SUMMARY OF THE INVENTION

It is an object of the present invention to provide an improved climate controller for automobiles, which can prevent a compressor from getting into a dry condition even when the climate controller and/or an engine are left in a stopped condition for long time, and thus can eliminate the problem of the failure of lubrication.

In accordance with the present invention, there is provided a climate controller for an automobile, comprising a closed-loop refrigerant passage connecting a compressor, a condenser, a receiver, an expansion member and an evaporator for sequentially circulating a refrigerant through these components to establish a refrigerating cycle; and a valve arranged in a part of the closed-loop refrigerant passage extending from the evaporator through the compressor to the condenser, the valve being actuated to intersect a communication of the refrigerant through the part of the passage when an operation affecting temperatures of both the compressor and the condenser becomes ineffective, and to release the communication when the operation becomes effective.

In the above structure, "an operation affecting temperature of both the compressor and the condenser" means an operation in which, such as in the operation of the engine or of the climate controller, the temperature of both the compressor and the condenser is increased when the operation becomes effective, e.g., when the engine starts, and is lowered when the operation becomes ineffective, e.g., when the engine stops. In more detail, when the engine operates, the temperature of both the compressor and the condenser is increased by heat radiating from the engine and a radiator and by a temperature rise of the atmosphere inside the engine compartment due to the heat radiation of the engine and the radiator. Also, when the climate controller operates, the temperature of both the compressor and the condenser is increased by establishing the refrigerating cycle.

In this arrangement, the valve is actuated to intersect the communication of the refrigerant through the passage part extending from the evaporator through the compressor to the condenser when the above operation becomes ineffective, e.g., when the engine or the climate controller stops. Accordingly, the refrigerant cannot be transferred in the passage part from the evaporator through the compressor to the condenser, even when the climate controller and/or the engine are left in a stopped condition for long time, and thus the problem of the failure of lubrication is eliminated. On the other hand, the valve is actuated to open such a communication when the above operation becomes effective, e.g., when the engine or the climate controller starts. Accordingly, it is ensured that the refrigerating cycle is established in the closed-loop refrigerant passage. In this condition, the temperature of both the compressor and the condenser is increased, and thus the refrigerant does not liquefy in these components.

It is advantageous that the above-mentioned climate controller further comprises a control circuit for providing an on-off signal to change a condition of the operation of the climate controller. In this case, the control circuit may further instruct the valve to open or close corresponding to the on-off signal.

In a preferred aspect, the valve is actuated to close when a predetermined time has passed after the climate controller is brought to a stopped condition. In this aspect, the refrigerant can transfer through the passage part to entirely equalize the pressure in the closed-loop passage during the predetermined time before the valve closes, whereby an operational load when the climate controller restarts is minimized to ensure a smooth starting operation.

In another preferred aspect, the valve is automatically actuated when the above operation changes to an ineffective or an effective condition. However, it is within the scope of the present invention that the valve is manually actuated by an operator after he confirms that the above operation becomes ineffective or effective.

It is also advantageous that the valve comprises an electromagnetic valve, because a general purpose electromagnetic valve can be used, which serves to restrain a rise in the manufacturing cost.

In a further preferred aspect, the part of the closed-loop refrigerant passage includes a suction pipe directly connecting the evaporator to the compressor, and the valve is arranged in the suction pipe. In this aspect, the suction pipe is shut-off during the period that the climate controller stops, so that the refrigerant is prevented from gathering in the compressor in a liquefied phase through the suction pipe. Accordingly, the disadvantage of the compression of liquid, which may be caused at the time of starting the conventional climate controller for automobiles, is surely eliminated.

Also in this aspect, the compressor may include a casing having a suction chamber and a discharge chamber both connected with the refrigerant passage, a plurality of cylinders formed in the casing, and a plurality of pistons respectively positioned in the cylinders; the casing including a crankcase for accommodating a drive mechanism for reciprocating the pistons in the cylinders, and the suction pipe being connected with the crankcase.

In this case, the drive mechanism of the compressor may include a drive shaft supported on the casing, a swash plate disposed on the drive shaft to be rotatable together with the drive shaft, and a pair of shoes arranged between the swash plate and each of the pistons to convert a rotation of the swash plate to a reciprocation of the each piston.

It is further advantageous that a hydrofluorocarbon material is used as a refrigerant. In this case, the hydrofluorocarbon material may be 1,1,1,2-tetrafluoroethane. The hydrofluorocarbon material does not destroy the ozonosphere, which makes the climate controller a superior system for environmental protection.

The compressor and the receiver may be arranged in an engine compartment of the automobile, the condenser may be located at an outside-air inlet of the engine compartment, and the expansion member and the evaporator may be disposed in a passenger compartment of the automobile.

BRIEF DESCRIPTION OF THE DRAWINGS

The above and other objects, features, and advantages of the present invention will become more apparent from the following description of preferred embodiments in connection with the accompanying drawings, in which.

DESCRIPTION OF THE PREFERRED EMBODIMENT

Figure 2:
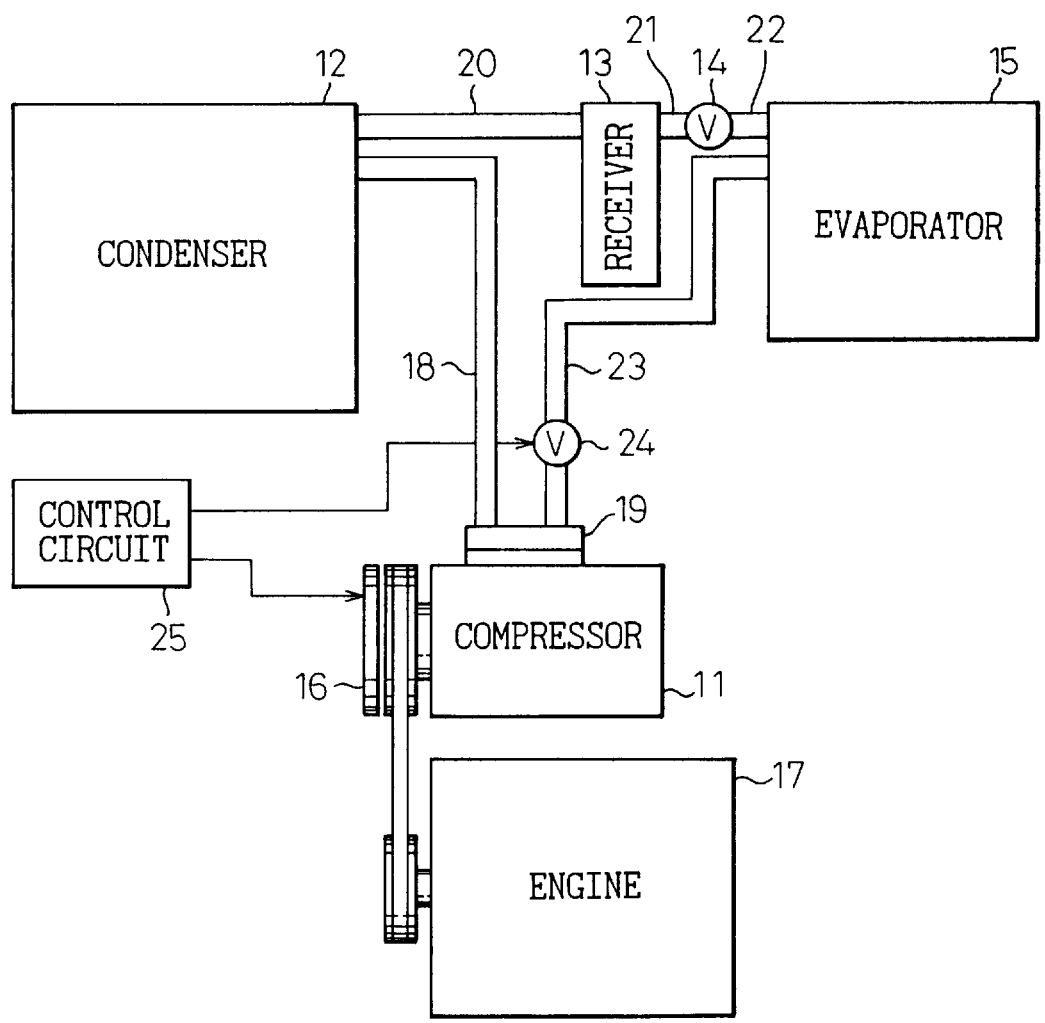
FIG. 2 is a diagrammatic illustration of a closed-loop refrigerant passage of an embodiment of a climate controller for automobiles, according to the present invention.

Referring now to the drawings, FIG. 2 diagrammatically shows a closed-loop refrigerant passage or circuit of an embodiment of a climate controller according to the present invention. In this climate controller, a compressor 11 is connected through an electromagnetic clutch 16 thereof to an engine 17. A condenser 12 is connected through a first part 18 of the passage and a flange 19 of the compressor 11 to the discharge port (described below) of the compressor 11. The condenser 12 is also connected through a second part 20 of the passage to a receiver 13 having a dryer. The receiver 13 is also connected through a third part 21 of the passage to an expansion valve 14. The expansion valve 14 is also connected through a fourth part 22 of the passage to an evaporator 15. Then, the evaporator 15 is also connected through a suction pipe 23, as a fifth part of the passage, and the flange 19 to the inlet port (described below) of the compressor 11. The flange 19 may be provided with a suction-port flange and a discharge-port flange formed integrally with each other. In this manner, a refrigerant can be circulated through the closed-loop passage to establish a refrigerating circuit.

In the climate controller of the present embodiment, an electromagnetic valve 24 is arranged at the midpoint of the suction pipe 23. The electromagnetic valve 24 acts as the valve of the present invention, and is actuated to intersect a communication of the refrigerant through the suction pipe 23 when an operation affecting temperature of both the compressor 11 and the condenser 12 becomes ineffective, and to release the communication when the operation becomes effective, as described in detail below.

Figure 3:
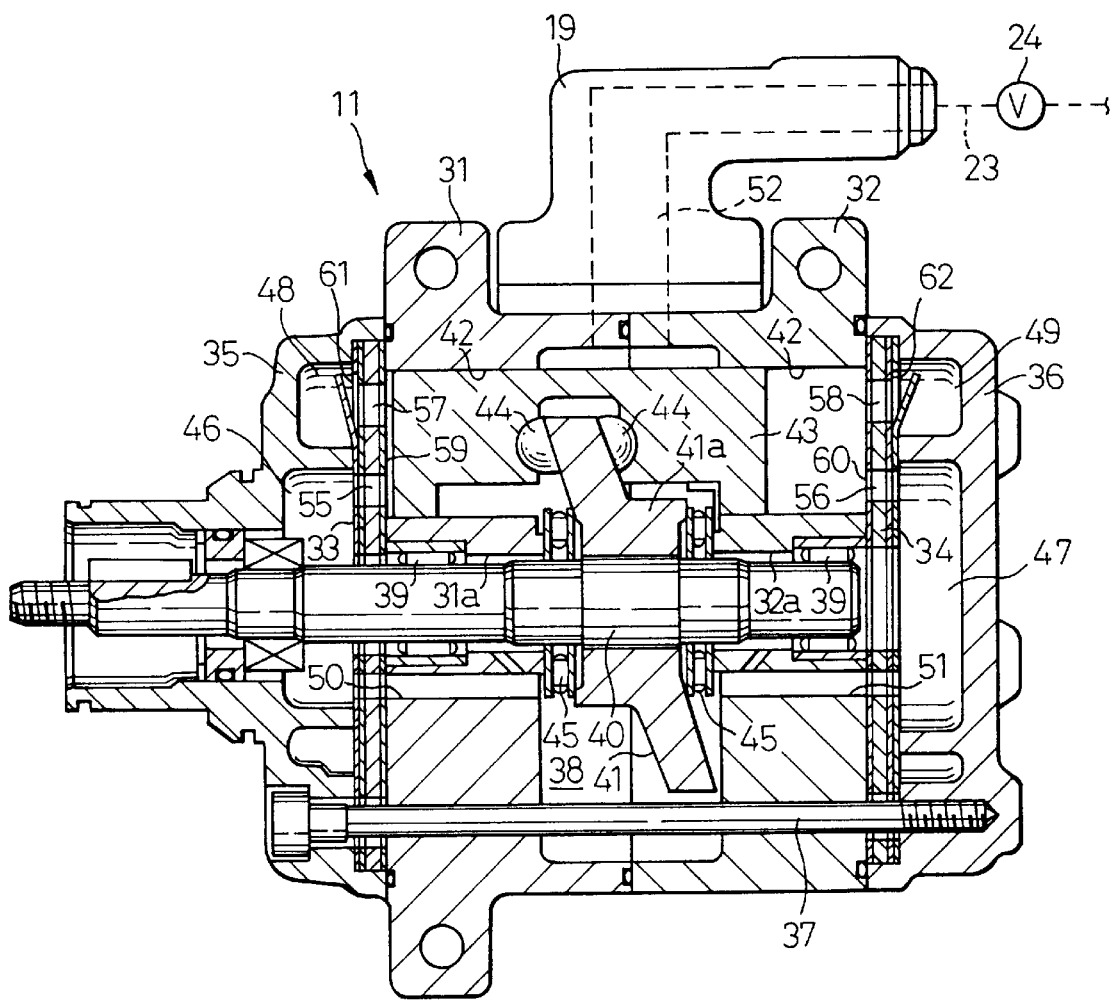
FIG. 3 is a vertical sectional view of a compressor which can be used in the climate controller of FIG. 2.

The compressor 11 may be a swash plate type compressor having a plurality of double-headed pistons, the structure of which is illustrated in FIG. 3. As shown in FIG. 3, the swash plate compressor 11 includes front and rear cylinder blocks 31 and 32 coaxially abutted at the first axial ends thereof to each other, front and rear valve plates 33 and 34 arranged at the second axial ends, opposite to the first ends, of the front and rear cylinder blocks 31, 32, and front and rear cylinder heads 35 and 36 respectively fixed to the second ends of the front and rear cylinder blocks 31, 32 by bolts 37 to securely hold the front and rear valve plates 33, 34 between the cylinder blocks 31, 32 and the cylinder heads 35, 36.

The cylinder blocks 31, 32 are provided at generally the centers thereof with axially extending shaft bores 31a, 32a, respectively, and define at the abutted first ends of the cylinder blocks 31, 32 a swash plate chamber 38 acting as a crankcase which communicates with the shaft bores 31a, 32a. The shaft bores 31a, 32a are aligned with each other, and a drive shaft 40 is inserted into center holes of the valve plates 33, 34 and the shaft bores 31a, 32a to be rotatably supported through radial bearings 39 by the cylinder blocks 31, 32. A swash plate 41 acting as a cam plate is coaxially fixed to the drive shaft 40 and is accommodated in the swash plate chamber 38 in such a manner that the swash plate 41 can rotate together with the drive shaft 40.

The cylinder blocks 31, 32 also define around the shaft bores 31a, 32a a plurality of (e.g., five) axially extending cylinder bores 42. The cylinder bores 42 are located radially about and separately from the shaft bores 31a, 32a, and are communicated with the swash plate chamber 38. A double-headed piston 43 is accommodated in each of the cylinder bores 42 in an axially slidable manner. Each piston 43 is slidably engaged through a pair of shoes 44 with the outer peripheral region of the swash plate 41, and is reciprocally moved in the cylinder bore 42 when the driving shaft 40 and the swash plate 41 rotate, to obtain a compressing operation. In this connection, the swash plate 41 is also supported at the boss section 41a thereof through thrust bearings 45 by the cylinder blocks 31, 32.

The cylinder heads 35, 36 are provided at the central regions thereof with suction chambers 46, 47 and at the outer peripheral regions thereof with discharge chambers 48, 49, respectively. The suction chambers 46, 47 communicate through suction passages 50, 51, respectively, formed between the adjacent cylinder bores 42, with the swash plate chamber 38. The swash plate chamber 38 is further connected through a suction port 52 provided in the flange 19 with the suction pipe 23 of the above-mentioned refrigerant passage or circuit, and the discharge chambers 48, 49 are connected through a discharge port (not shown) with the first part 18 of the refrigerant passage.

The valve plates 33, 34 are provided with suction openings 55, 56 for communicating the suction chambers 46, 47 with the cylinder bores 42, respectively, and discharge openings 57, 58 for communicating the discharge chambers 48, 49 with the cylinder bores 42, respectively. Suction valves 59, 60 for opening/closing the suction openings 55, 56 are located on one side of the valve plates 33, 34 facing to the cylinder bores 42, respectively, and discharge valves 61, 62 for opening/closing the discharge openings 57, 58 are located on the other side of the valve plates 33, 34 facing to the discharge chambers 48, 49, respectively.

Figure 1:
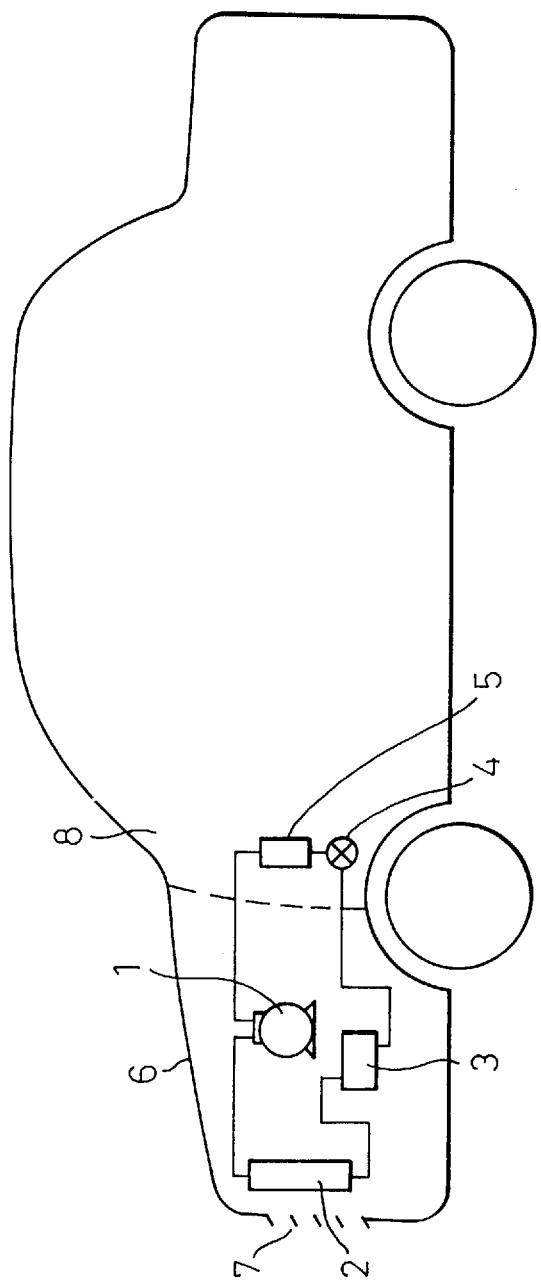
FIG. 1 is a diagrammatic illustration of a closed-loop refrigerant passage and the arrangement of components of a prior art climate controller for automobiles.

In the climate controller of the present embodiment, HFC-134a is filled as a refrigerant within the closed-loop refrigerant passage constructed in the above manner. Similar to the prior art structure of FIG. 1, the compressor 11 and the receiver 13 having a dryer are arranged within an engine compartment, the condenser 12 is located in the vicinity of a fresh-air inlet of the engine compartment, and the evaporator 15 and the expansion valve 14 ate disposed within a passenger compartment. The electromagnetic valve 24 is also arranged in the engine compartment.

Referring again to FIG. 2, an on-off control electrical circuit 25, which includes an on-off switch (not shown) for providing an on-off signal to change an operational condition of the climate controller, etc., is electrically connected to both the electromagnetic clutch 16 and the electromagnetic valve 24. When the on-off switch of the climate controller is activated, the control circuit 25 instructs both the electromagnetic clutch 16 and the electromagnetic valve 24 to open or close. Normally, the on-off switch of the climate controller is designed to be turned off in an interlocked manner when the ignition switch of the engine is turned off.

The mode of operation of the climate controller for automobiles of the above-mentioned structure will be described below.

When the on-off switch of the climate controller is turned on during the running condition of the engine or simultaneously to the start of the engine, the control circuit 25 provides the instruction for starting the climate controller, i.e., an operation of the climate controller affecting temperature of both the compressor and the condenser becomes effective. In more detail, the control circuit 25 instructs the electromagnetic clutch 16 to close or come in an engaged position, and simultaneously instructs the electromagnetic valve 24 to open. Also, blower units (not shown) for cooling the condenser 12 and the evaporator 15 are actuated.

When the climate controller starts to operate due to the above operation, a refrigerant is provided, at a high temperature and a high pressure, by the compressor 11, and then flows into the condenser 12 to be cooled by outside air to condense and liquefy. The liquefied refrigerant flows into the receiver 13 having the dryer is dehydrated and stored therein. Then, the dehydrated liquefied refrigerant is atomized under reduced pressure in the expansion valve 14, and then flows into the evaporator 15. The atomized refrigerant is heated and evaporated in the evaporator 15 to refrigerate the atmosphere in the passenger compartment, and then flows through the electromagnetic valve 24 into the compressor 11.

When the on-off switch of the climate controller is manually or automatically turned off because the interior of the passenger compartment is cooled to the predetermined temperature by the above operation of the climate controller, or when the engine ignition switch is turned off and thereby the on-off switch of the climate controller is turned off, the control circuit 25 instructs the electromagnetic clutch 16 to open or move to a release position, and thus the climate controller stops. That is, an operation of the climate controller affecting temperature of both the compressor and the condenser becomes ineffective.

In the condition just after the climate controller stops, the pressure distribution in the refrigerant passage is similar to that in the operating condition, i.e., the pressure is highest in the compressor 11, is lowered successively in the condenser 12 and in the receiver 13, and is lowest in the evaporator 15. Then, the pressure is equalized due to the transfer of the refrigerant through the closed-loop passage extending from the condenser 12 through the compressor 11 to the evaporator 15. When the predetermined time corresponding to the time expected for equalizing the pressure has passed after the climate controller stops, the electromagnetic valve 24 is actuated to close by the instruction of the control circuit 25.

During the equalizing of the pressure, the other passage extending from the condenser 12 through the receiver 13 and the expansion valve 14 to the evaporator 15 is substantially shut-off by the expansion valve 14 and thus the refrigerant hardly flows therethrough, because the expansion valve 14 has a large fluid resistance for the refrigerant and acts to substantially close when the climate controller stops.

If the temperature of the outside atmosphere is lowered to under a predetermined value by, e.g., getting cold at night, while the climate controller and the engine of an automobile are left in a stopped condition, the refrigerant begins to liquefy at the compressor 11 and the condenser 12, and thus transfers through the refrigerant passage. During this transfer of the refrigerant, the liquefied refrigerant is gathered in the swash plate chamber 38 of the compressor 11 and mixes with the lubricating oil therein, and then discharges from the compressor 11 together with the lubricating oil to the condenser 12.

At this time, the electromagnetic valve 24 closes the suction pipe 23 connecting the evaporator 15 with the compressor 11 and interrupts the fluid communication of the refrigerant in the suction pipe 23, so that the refrigerant transfers only from the compressor 11 to the condenser 12, and cannot transfer from the evaporator 15 to the compressor 11. Therefore, the amount of the refrigerant transferring from the compressor 11 to the condenser 12 does not exceed the amount of the refrigerant remaining in the compressor 11 just after the pressure in the refrigerant passage is equalized. Therefore, the amount of the lubricating oil discharged together with the refrigerant from the compressor 11 is minimized.

The above embodiment of the present invention possesses various advantageous effects as follows.

The electromagnetic valve 24 provided in the suction pipe 23 connecting the evaporator 15 with the compressor 11 is actuated to close when the predetermined time has passed after the climate controller stops so that the refrigerant cannot transfer from the evaporator 15 to the compressor 11 even when the climate controller and the engine are left in a stopped condition for long time. Consequently, the problem in the prior art systems wherein the refrigerant flows from the evaporator to the compressor, condenses and liquefies in the compressor to be mixed with lubricating oil, and flows together with the lubricating oil into the condenser, can be eliminated, and thereby the drying-up of the lubricating oil and the dry condition of the compressor are prevented. Therefore, the problems of the failure of lubrication at the time of starting the climate controller can be overcome.

In this connection, the electromagnetic valve 24 is actuated to close when the predetermined time has passed after the climate controller stops, to ensure that the pressure in the refrigerant circuit is fully equalized, so that an operational load when the climate controller restarts is minimized to ensure a smooth starting operation.

The climate controller of the above embodiment makes it possible to use HFC-134a as a refrigerant, which does not destroy the ozonosphere, and thus is a superior system for environmental protection.

The control circuit 25 may be designed to indicate various controllable operations of various components of the climate controller, including the on/off control of the electromagnetic clutch 16 and the open/close control of the electromagnetic valve 24.

The electromagnetic valve 24 is provided in the suction pipe 23 connecting the evaporator 15 with the compressor 11, so that the refrigerant is prevented from gathering in the compressor 11 in a condensed and liquefied phase during the period that the climate controller stops. Accordingly, the disadvantage of the compression of liquid, which may be caused at the time of starting the conventional climate controller for automobiles, is surely eliminated.

The electromagnetic valve 24 used as a valve for intercepting the refrigerant flow from the evaporator 15 through the compressor 11 to the condenser 12 has a flexibility of application, and thus can be freely chosen in relation to the shape or the controllability under a certain relationship with the other components of the climate controller. Also, the electromagnetic valve 24 is mounted at the midway of the suction pipe 23, so that a general purpose electromagnetic valve of a pipe-connection type can be used. Therefore, the use of the electromagnetic valve 24 serves to restrain the rise in the manufacturing cost.

The present invention may include various modifications of the above embodiment, as follows.

The electromagnetic valve 24 may be actuated to open at the same time when an operation affecting temperature of both the compressor and the condenser, i.e., the operation of the climate controller, starts, and closes at the same time when the operation stops.

The electromagnetic valve 24 may be actuated when the starting switch of the engine is turned on or off, irrespective of the on/off state of the switch of the climate controller. In this case, when the engine ignition switch is turned, the engine starts or stops and simultaneously the control circuit 25 instructs the electromagnetic valve 24 to open or close. When the engine starts, the temperature of the engine compartment rises due to the heat generated at the engine and radiated from the radiator, and thus the temperatures of the compressor 11 and the condenser 12 rise, so that the refrigerant does not liquefy in the compressor 11 and the condenser 12.

Further in this case, the electromagnetic valve 24 may be actuated to close when the predetermined time has passed after the engine stops. During this predetermined time, the temperature of the engine compartment may be gradually lowered without enabling the refrigerant to liquefy in the condenser 12, and the pressure in the refrigerant passage is equalized. Such a predetermined time, not enough to liquefy the refrigerant in the condenser 12, may be obtained by tests.

The electromagnetic valve 24 may be of a packless valve. The packless valve may be manually actuated to open or close by an operator, or may be automatically actuated by a servo motor.

The electromagnetic valve 24 may be attached directly on the suction side of the flange 19 or the suction port 52 of the compressor 11. In this arrangement, a pipe section between the compressor 11 and the electromagnetic valve 24 can be removed to simplify the construction of the climate controller.

Alternatively, the electromagnetic valve 24 may be arranged in the first part 18, i.e., a discharge pipe, of the refrigerant passage extending from the compressor 11 to the condenser 12.

The refrigerant may be a hydrofluorocarbon alternative fluorocarbon material other than HFC-134a, such as ASHRAE (American Society of Heating, Refrigeration and Air Conditioning Engineers) #404a. This refrigerant is a composition of 44% pentafluoroethane (HFC-125), 52% 1,1,1-trifluoroethane (HFC-143a), and 4% 1,1,1,2-tetrafluoroethane (HFC-134a).

The expansion valve 14 as an expansion member may be replaced by a capillary tube.

While the invention has been particularly shown and described with reference to preferred embodiments thereof, it will be understood by those skilled in the art that various changes and modifications may be made without departing from the spirit and scope of the invention. The scope of the invention is therefore to be determined solely by the appended claims.

We claim:

1. A climate controller for an automobile comprising:
   a closed-loop refrigerant passage connecting a compressor, a condenser, a receiver, an expansion member and an evaporator for sequentially circulating a refrigerant through the aforesaid components to establish a refrigerating circuit said closed-loop refrigerant passage including as a part thereof, a suction pipe directly connecting said evaporator with said compressor; and
   a valve arranged in said suction pipe, said valve being actuated to intersect a communication of the refrigerant through said suction pipe when an operation affecting temperatures of both said compressor and said condenser becomes ineffective, and to release said communication when said operation becomes effective;
   wherein said compressor includes a crankcase accommodating a sliding portion of a drive mechanism of said compressor; and
   wherein said suction pipe is connected with said crankcase.

2. The climate controller of claim 1, further comprising a control circuit for providing an on-off signal to change a condition of said operation of said climate controller.

3. The climate controller of claim 2, wherein said control circuit further instructs said valve to open or close corresponding to said on-off signal.

4. The climate controller of claim 2, wherein said control circuit is associated with an operating switch of said climate controller.

5. The climate controller of claim 2, wherein said control circuit is associated with an engine ignition switch of the automobile.

6. The climate controller of claim 1, wherein said valve is closed when a predetermined time expected for equalizing a pressure in said refrigerant passage has passed after said climate controller is brought to a stop condition.

7. The climate controller of claim 1, wherein said valve is automatically actuated when said operation comes to said ineffective or effective condition.

8. The climate controller of claim 1, wherein said valve comprises an electromagnetic valve.

9. The climate controller of claim 8, wherein said electromagnetic valve is actuated by a control circuit for providing an on/off signal to change a condition of said operation of said climate controller.

10. The climate controller of claim 1, wherein said compressor includes a casing having a suction chamber and a discharge chamber both connected with said refrigerant passage, a plurality of cylinders formed in said casing, and a plurality of pistons respectively positioned in said cylinders; said casing including said crankcase for accommodating said drive mechanism for reciprocating said pistons in said cylinders.

11. The climate controller of claim 10, wherein said drive mechanism of said compressor includes a drive shaft supported on said casing, a swash plate disposed on said drive shaft to be rotatable together with said drive shaft, and a pair of shoes arranged between said swash plate and each of said pistons to convert a rotation of said swash plate to a reciprocation of said each piston.

12. The climate controller of claim 1, wherein a hydrofluorocarbon material is used for said refrigerant.

13. The climate controller of claim 12, wherein said hydrofluorocarbon material is 1,1,1,2-tetrafluoroethane.

14. The climate controller of claim 1, wherein said compressor and said receiver are arranged in an engine compartment of the automobile, said condenser is located at an outside-air inlet of said engine compartment, and said expansion member and said evaporator are disposed in a passenger compartment of the automobile.

* * * * *

UNITED STATES PATENT AND TRADEMARK OFFICE
CERTIFICATE OF CORRECTION

PATENT NO. : 5,842,354
DATED : December 1, 1998
INVENTOR(S) : Kazuhito KAWASUMI, Shinichi SATO, Hideo MORI
Toshihiko NASU, Motonobu KAWAKAMI and Akio MORISHITA It is certified that error appears in the above-identified patent and that said Letters Patent is hereby corrected as shown below:

On the Title page, item [73] Assignee should read --

KABUSHIKI KAISHA TOYODA JIDOSHOKKI SEISAKUSHO
    Kariya, Japan

DENSO CORPORATION
    1-1 Showa-Sho,
    Kariya, Japan     --.

Signed and Sealed this

Tenth Day of August, 1999

Attest:

Q. TODD DICKINSON

*Attesting Officer*      *Acting Commissioner of Patents and Trademarks*